United States Patent Office 3,592,809
Patented July 13, 1971

3,592,809
PROCESS FOR THE PRODUCTION OF LACTAMS
Otto Immel and Hermann Schnell, Krefeld-Uerdingen, and Hans-Helmut Schwarz, Krefeld, Germany, assignors to Farbenfabriken Bayer Aktiengesellschaft, Leverkusen, Germany
No Drawing. Filed Apr. 16, 1968, Ser. No. 721,580
Claims priority, application Germany, Apr. 25, 1967,
F 52,235
Int. Cl. C07d 41/06
U.S. Cl. 260—239.3
8 Claims

ABSTRACT OF THE DISCLOSURE

The invention relates to a process for the production of lactams by catalytical rearrangement of ketoximes in the gaseous phase, using as a catalyst system a mixture of boron trioxide or boric acid, highly dispersed carbon, and one or more additional inorganic supporting material, said highly dispersed carbon having a particle size of less than 0.1 mm. in diameter.

---

This invention relates to a process for the production of lactams by catalytic rearrangement of cyclic ketoximes in the gaseous phase.

It is known that cyclic ketoximes can be rearranged, in the gaseous phase at temperatures in a range from 250 to 400° C. on fixed catalysts into the corresponding lactams. In the more important processes, catalysts containing boric acid are normally used, the boric acid being applied to supports such as aluminium oxide, titanium dioxide, tin dioxide, zinc oxide or diatomaceous earth. The oxime vapours are passed over these catalysts, with or without a carrier gas, at elevated temperature and at atmospheric or reduced pressure. Particularly high lactam yields are obtained by rearranging the oximes in the presence of steam, using aqueous oxime. Unfortunately, the boric acid is highly volatile in the presence of steam at the high reaction temperature employed so that the boric acid catalysts have only a limited service life. Under otherwise similar rearrangement conditions, the higher the $B_2O_3$-content of these catalysts, the longer their effective life. Experience has shown, however, that the $B_2O_3$-content of these catalysts cannot be arbitrarily increased, because this may result in a reduction of activity. This applies for example to the $B_2O_3 \cdot TiO_2$-catalyst, which gives the highest lactam yields of the conventional catalysts. Although boric acid/aluminium oxide catalysts having an extremely high $B_2O_3$-content can be prepared, the lactam yields obtained with them are far from satisfactory.

It is an object of this invention, to provide a process for the production of lactams which comprises rearranging a cyclic ketoxime in the gaseous phase in the presence of a catalyst system consisting of a mixture of boric acid or boron trioxide, highly dispersed carbon and one or more additional inorganic supporting materials, said highly dispersed carbon having a particle size of less than 0.1 mm. in diameter, said rearranging being effected at temperatures of from 200 to 400° C.

It is possible in this way to obtain higher lactam yields than is possible by the conventional processes used for the catalytic rearrangement of oximes. When used in the rearrangement of oximes, the catalysts according to the invention give higher lactam yields than the corresponding catalysts which, though containing the same amount of boric acid, do not contain any finely divided carbon. The catalysts according to the invention have a high boric acid content, which provides them with an extremely long service life.

Oxides of elements of the IIId and IVth Main Groups and sulfites, sulfates and phosphates of the IId Main Group of the Mendeleeff Periodic System, are preferably used as the supporting materials. It is also possible to use inter alia diatomaceous earth, zinc oxide, zinc phosphate, boron phosphate, and manganese, iron and nickel oxides as supporting materials. The aforementioned supports may be combined with boric acid and finely divided carbon both individually and in admixture with one another. Carbon black, graphite, active carbon and/or coke with a grain size of less than 0.1 mm. may be used as the highly dispersed carbon. It is preferred to use commercial carbon black having an average particle size of less than 5000 A. in diameter.

The process according to the invention, in which lactam yields of up to 98% are obtained, is suitable for rearrangement of cyclic ketoximes with from 5 to 12 carbon atoms in the ring, for example cyclopentanone oxime, cyclohexanone oxime, methyl cyclohexanone oxime, cycloheptanone oxime, cyclo-octanone oxime and cyclododecanone oxime. The process is particularly suitable for the rearrangement of cyclohexanone oxime.

The rearrangement reaction can be carried out at atmospheric pressure or at reduced pressure, and at a temperature in the range from 200 to 400° C., preferably at a temperature in the range from 240 to 360° C. It may be carried out in the presence of various gases, for example nitrogen, hydrogen, carbon monoxide, carbon dioxide and/or ammonia, which may be used as supporting, protective or, when the fluidised bed principle is employed as fluidising gases. The use of steam or of aqueous oxime has a particularly advantageous effect on rearrangement. The aqueous oxime formed in the production of oximes on an industrial scale may be used in the catalytic rearrangement without dehydration.

The catalysts may readily be prepared, for example by thoroughly mixing boric acid, carbon black and a supporting material such as aluminium oxide, titanium dioxide or calcium phosphate, and making the resulting mixture into a paste with a little water in a kneading machine. The resulting mass, which may be pelletised or extruded, is dried at 100° C. and calcined at 400–800° C. It is also possible to prepare the catalysts by mixing boric acid with finely divided carbon, making the resulting mixture into a paste with a little water or an organic liquid, and then applying the resulting paste to a supporting material.

Suitable catalysts may also be obtained by dissolving the soluble components in for example, water, stirring the insoluble components into this solution, drying the resulting mass and calcining at elevated temperature.

The following examples are to further illustrate the invention without limiting it.

EXAMPLE 1

40 parts by weight of boric acid, 12 parts by weight of titanium dioxide and 8 parts by weight of active carbon having a particle size of less than 0.1 mm. were made into a paste with water. The resulting paste was dried at 120° C., calcined for two hours at around 570° C., size-reduced and sieved. 72 g. of cyclohexanone oxime containing 4% by weight of water were passed over 20 g. of the catalyst thus obtained having a grain size of from 0.2 to 1 mm. in a period of 4 hours at 320–340° C./40 torr. The amount of the resulting reaction product corresponded to an oxime conversion of 44% and to a caprolactam yield of 97.7% based on the cyclohexanone oxime reacted.

If, by contrast, a catalyst prepared from 40 parts by weight of boric acid and 20 parts by weights of titanium dioxide is used, an oxime conversion of only 14% and a lactam yield of only 93%, based on the cyclohexanone oxime reacted, is obtained under otherwise the same reaction conditions.

EXAMPLE 2

72 parts by weight of $H_3BO_3$, 42 parts by weight of $CaHPO_4$ and 10 parts by weight of a gas black having an average particle size of 118 A., were made into a paste with water. The paste was dried at 120° C., calcined for 3 hours at 700–800° C. with exclusion of air and size reduced 34.5 g. of cyclohexanone oxime containing 4% by weight of water were passed over 20 g. of the catalyst thus obtained, having a grain size of from 0.1 to 1 mm., in a period of 2 hours at 320–350° C./40 torr. The oxime conversion amounted to 93% and the caprolactam yield to 98%, based on the cyclohexanone oxime converted.

EXAMPLE 3

25 parts by weight of $H_3BO_3$, 20 parts by weight, of $CaSO_4 \cdot \frac{1}{2}H_2O$, and 5 parts by weight of a gas black having an average particle size of around 400 A. were made into a paste with water. The resulting paste was dried at 120° C., calcined for 2 hours at approximately 550° C. and then size-reduced. 20 g. of the resulting catalyst, having a grain size of from 0.2 to 2 mm., were used for oxime rearrangement at 320° C./40 torr. 30.7 g. of cyclohexanone oxime containing 4% by weight of water were passed through the catalyst sample in a period of 2 hours. The cyclohexanone oxime underwent complete reaction, the caprolactam yield amounting to 97%.

EXAMPLE 4

40 parts by weight of $H_3BO_3$, 2 parts by weight of $\gamma$-$Al_2O_3$ 2 parts by weight of $Ca_3(PO_4)_2$, 2 parts by weight of $TiO_2$, 4 parts by weight of $MgSO_4 \cdot 7H_2O$, and 6 parts by weight of a gas black having an average particle size of around 400 A., were mixed together and the resulting mixture was made into a paste with a little water in a kneading machine. The resulting paste was dried and calcined for 3 hours at 550° C. 101 g. of cyclohexanone oxime containing 4% by weight of water were passed over 20 g. of the catalyst thus obtained, having a grain size of from 0.6 to 1 mm. in a period of 6 hours at 340° C./40 torr. The amount of the resulting reaction product corresponded to an oxime conversion of 71% and to a lactam yield of 98%, based on the cyclohexanone oxime reacted.

40 parts by weight of $H_3BO_3$, 4 parts by weight of $\gamma$-$Al_2O_3$, 4 parts by weight of $Ca_3(PO_4)_2$, 4 parts by weight of $TiO_2$ and 4 parts by weight of $MgSO_4 \cdot 7H_2O$ were used to prepare the catalyst for a comparison test. No carbon black was added. Although the conditions under which the catalyst was prepared and the oxime reacted were the same as those under which the carbon-black-containing catalyst was prepared and used the oxime conversion amounted to only 47% and the caprolactam yield 97.8%, based on the cyclohexanone oxime reacted.

EXAMPLE 5

50 parts by weight of $H_3BO_3$, 3 parts by weight of $\gamma$-$Al_2O_3$ and 20 parts by weight of a gas black having an average particle size of 1147 A., were thoroughly mixed and converted into a paste with a little water. The resulting paste was dried and calcined for 2 hours at 580° C. 10 g. of the catalyst thus prepared, having a grain size of from 0.5 to 1 mm., were used for the rearrangement of cyclohexanone oxime, 85.8 g. of cyclohexanone oxime containing 4% by weight of water were passed over this catalyst in a period of 5.4 hours at 320° C./40 torr. The amount of reaction product thus obtained corresponded to an oxime conversion of 47% and to a caprolactam yield of 97.8%, based on the cyclohexanone oxime reacted.

In a comparison test, in which no carbon black was employed 50 parts by weight of $H_3BO_3$ and 50 parts by weight of $\gamma$-$Al_2O_3$ were used to prepare the catalyst. The comparison catalyst was prepared and the oxime rearrangement was carried out on it under otherwise the same conditions as those under which the carbon-black-containing catalyst was prepared and used. In this instance, however, the oxime conversion amounted to only 24% and the caprolactam yield to only 95.8%, based on the cyclohexanone oxime reacted.

EXAMPLE 6

70 g. of boric acid and 30 g. of gas black having an average particle size of 1147 A. were mixed with 70 ml. of by weight 10% aqueous phosphoric acid, the resulting mixture was dried at 120° C. and then calcined for 3 hours at 580° C. in the absence of air. The resulting product, comprising boron trioxide, carbon black and boron phosphate was size-reduced and a specimen with a grain-size of 0.6 to 1 mm. was separated by grading. 30.5 g. of cyclohexanone oxime containing 4% by weight of water were passed over 20 g. of this catalyst sample in a period of 2 hours at around 320° C./40 torr. The oxime conversion amounted to 98% and the caprolactam yield to 98%, based on the cyclohexanone oxime reacted.

EXAMPLE 7

20 g. of a catalyst having the composition of the catalyst of Example 6 and a grain size of 0.5 to 2 mm. were used for the rearrangement of cyclohexanone oxime at atmosphere pressure, using nitrogen as a carrier gas. At a temperature of 320 to 340° C. 16.2 cyclohexanone oxime containing 4% by weight of water and 25 normal-litres of nitrogen were passed over this catalyst per hour. Always after a reaction time of 6 hours the catalyst was regenerated by calcinating in air at 600 to 700° C. Then it was used again. Losses of catalyst occurring during regenerating and rearranging reaction were compensated by addition of fresh catalyst. The catalyst was regenerated for 55 times, 14 g. of fresh catalyst being added in portions all over the time. Altogether 5158 g. of cyclohexanone oxime were passed over the catalyst during 330 hours. When interrupting the rearrangement reaction for the last time, the rate of conversion was 83%, the yield of caprolactam being 95%. The overall rate of conversion for the 330 hours' time of reaction was 79.2%, the overall yield of caprolactum being 95.2%, based on the oxime reacted.

114 parts by weight of caprolactam were produced with 1 part by weight of the catalyst.

What we claim is:

1. A process for the production of lactams which comprises rearranging a cyclic ketoxime having 5–12 carbon-atoms, in the gaseous phase, at a temperature of 200° C. to 400° C., in the presence of a catalyst system consisting of a mixture of
    (a) boric acid or boron trioxide;
    (b) highly dispersed carbon having a particle size of less than 0.1 mm. in diameter; and
    (c) one or more additional inorganic supporting materials selected from the group consisting of oxides of elements of the IIId and IVth Main Groups of the Mendeleeff Periodic System, sulfites, sulfates and phosphates of an element of the IId Main Group of the Mendeleeff Periodic System diatamaceous earth, zinc, oxide, zinc phosphate, boron phosphate, manganese oxide, iron oxide and nickel oxide.

2. The process of claim 1 wherein said highly dispersed carbon is activated carbon.

3. The process of claim 1 wherein said highly dispersed carbon is gas black.

4. The process of claim 1 wherein said additional inorganic supporting material is an oxide of an element of the IIId or Vth Main Group of the Mendeleeff Periodic System.

5. The process of claim 1 wherein said additional inorganic supporting material is a sulfite, sulfate, or phosphate of an element of the IId Main Group of the Mendeleeff Periodic System.

6. The process of claim 1 wherein said additional inorganic supporting material is boron phosphate.

7. The process of claim 1 wherein said rearranging is carried out at a pressure of from 0.1 to 150 torr.

8. The process of claim 1 wherein said cyclic ketoxime is cyclohexanone oxime.

References Cited
UNITED STATES PATENTS 3,154,539  10/1964  Irnich et al. _____ 260—239.3
3,210,338  10/1965  Huber et al. _____ 260—239.3

JOHN D. RANDOLPH, Primary Examiner
R. T. BOND, Assistant Examiner

U.S. Cl. X.R.
260—294.7F

UNITED STATES PATENT OFFICE
CERTIFICATE OF CORRECTION

Patent No. 3,592,809      Dated July 13, 1971

Inventor(s) Otto Immel et al.

It is certified that error appears in the above-identified patent and that said Letters Patent are hereby corrected as shown below:

Column 4, line 74, "Vth" should read -- IVth --.

Signed and sealed this 29th day of August 1972.

(SEAL)
Attest:

EDWARD M. FLETCHER, JR.
Attesting Officer

ROBERT GOTTSCHALK
Commissioner of Patents